(No Model.)
J. F. MARTIN.
UNDERGROUND MULTIPLE WIRE CABLE.
No. 286,948. Patented Oct. 16, 1883.
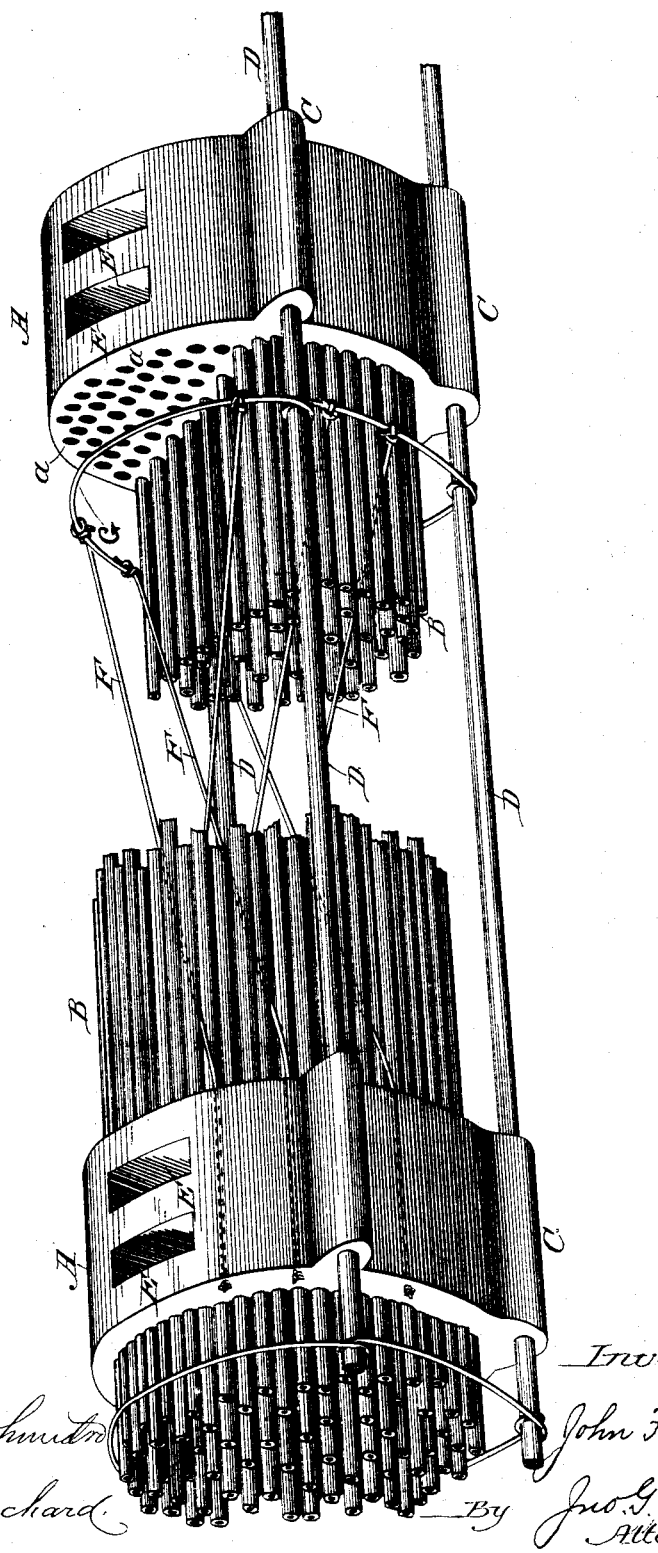
Witnesses:
Will R. Omohundro
Frank S. Blanchard.
Inventor:
John F. Martin
By Jno. G. Elliott
Attorney.

UNITED STATES PATENT OFFICE.

JOHN F. MARTIN, OF CHICAGO, ILLINOIS.

UNDERGROUND MULTIPLE-WIRE CABLE.

SPECIFICATION forming part of Letters Patent No. 286,948, dated October 16, 1883.

Application filed March 30, 1883. (No model.)

*To all whom it may concern:*

Be it known that I, JOHN F. MARTIN, a citizen of the United States, residing in Chicago, county of Cook, and State of Illinois, have invented certain new and useful Improvements in Underground Multiple-Wire Cables, of which the following is a specification.

This invention relates to underground systems for electric wires, in which the insulated wires are laid within a conduit.

In such systems where numerous wires are laid side by side within the conduit, considerable difficulty in the transmission of messages will necessarily result from what is known as "inductive retardation."

The object of my invention is to obviate all such defects, and to provide simple and efficient means for practically disposing of the detrimental effects resulting from current induction, as hereinafter described and claimed, and illustrated in the annexed drawing, which represents in perspective a set of tubular insulators and means for supporting the same within an underground conduit with my invention applied thereto.

A refers to perforated blocks or disks, made of some insulating material—such, for example, as asphaltum—and designed to be introduced in the pipe-sections of a conduit, in order to provide supports for the tubular insulators B, through which the electric wires are drawn. These insulating-supports with their connections and the tubes which pass through the supports are constructed and arranged substantially as described in a separate application which I have made for Letters Patent of the United States—that is to say, each support is provided with perforations $a$ for the tubes, and formed or provided with peripheral ears C, through which the metal rods D, employed for connecting together two or more of the supports, pass. These lugs or ears will be adapted to fit in grooves formed longitudinally within the conduit-pipe, whereby the disks shall be guided and prevented from turning while they are being introduced within the pipe, and the connecting rods or bars can be either passed through portions of the disk, as shown, or be secured in any suitable way to the periphery of the disk. The disk can also serve as couplings for the tube-section, so as to form continuous lines of tubing, and to such end the disks can be formed with chambers having openings E, through which some insulating-cement can be introduced, in order to embed the meeting ends of the tubes within a cement filling in the disks. In laying the wires, one wire only is drawn through each tube, and hence after the wires have been laid a multiple-wire cable will be produced composed of insulated wires held side by side by means of perforated insulated supports.

F F indicate conducting-wires interspersed among the bundle or assemblage of tubular insulators. These wires are secured at one end to one of the insulators A in any suitable way—as, for example, they are passed through openings in the disks—and at their remaining ends said wires are electrically connected with the ground, which said connection, as herein shown, is effected by fastening the wires to a metal band or ring, G, encircling the bundle of tubes, and secured to the rods D, which pass through the insulators. It will be understood that these rods will be electrically connected at one end only with the ground, and for such purpose the rods can be extended at one end into a drawing-in box along the route, and have their ends within such trap or box placed in metallic connection with the earth. The opposite ends of the rods will, however, stop short of the next box or trap in the conduit, or be insulated therefrom in any suitable way. By the above means the wires tend to carry off the induced currents to the earth, and hence effectually remedy the disturbances which would otherwise take place. The wires can be wound spirally through the collection of insulating-tubes, or be arranged diagonally, and extend substantially the distance between two adjacent insulating-supports, or they can be arranged in other approved ways through the bundle, and, in lieu of being connected with a metal ring secured to the rods the wires could be connected directly with the rods, although the arrangement herein shown will be found most convenient. These rods D, while serving as means for connecting and thereby admitting of two or more of the perforated insulating-disks being pushed along within a pipe-section, also serve as conductors for carrying off the induced currents, and, being arranged outside of the collection of tubular insulators, admit of any number of wires interspersed in a variety of ways throughout the bundle being brought to the surface thereof and there connected with the conductors.

The conduit-pipes can also be made of terra-cotta or asphaltum, since the rods constitute conductors through the conduit, and hence no metal is required in the construction of the pipe.

Having thus described my invention, what I I claim, and desire to secure by Letters Patent, is—

1. The combination, with the insulated supports for a series of tubular insulators for electric wires, of the electric conductors interposed between the tubular insulators and electrically connected with metal conducting-rods, which connect the said insulating-supports, substantially as described.

2. The combination, with the insulating-supports A, of the electric conductors interposed between tubular insulators passing through said supports, these said conductors being connected at one end with one of the insulating-supports, and at their remaining ends electrically connected with metal rods, which connect the supports with each other, substantially as described.

3. The combination, with the insulating-supports A, connected by metal rods, of the insulating-tubes held by said supports, and the conductors interposed between the insulating-tubes and connected with a metal ring passing around the set of tubular insulators, and secured to the metal rods, substantially as described.

JOHN F. MARTIN.

Witnesses:
W. W. ELLIOTT,
CHAS. G. PAGE.